March 12, 1957  G. E. BARNHART  2,785,026
SEAL RING CONSTRUCTION
Filed May 18, 1954
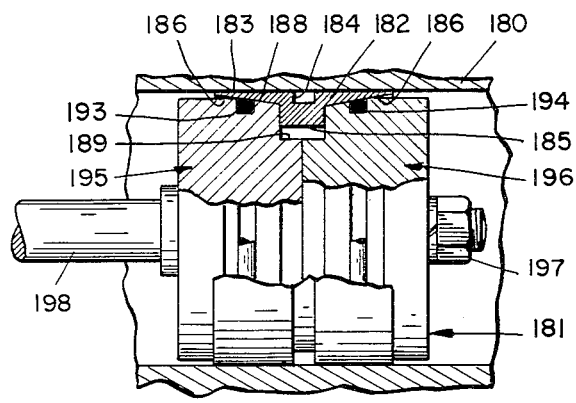
INVENTOR
GEORGE E. BARNHART
BY
ATTORNEYS

2,785,026
SEAL RING CONSTRUCTION

George E. Barnhart, Altadena, Calif.

Application May 18, 1954, Serial No. 430,479

4 Claims. (Cl. 309—33)

This invention has to do with cylindrical metal forms and particularly with piston or cylinder assemblies to be used for power elements or accumulators.

An object of the invention is to provide a seal means, flexible within the yield point of the material, which is not adversely affected by usual aging or deteriorating factors.

Still another object is to provide a low friction sealing means embodying compression means out of contact with a relatively moving surface for urging a sealing ring portion against such a surface.

The figure in the drawing is a sectional elevational view of a piston showing a seal ring construction embodying the invention.

Referring to the drawing, I show a seal ring construction useful on pistons and having the advantage that it will function properly after long periods of idleness between use or after long storage. Referring to that figure, 180 indicates a cylinder in which is a piston 181 having a special piston ring 182. The latter may be of metal for most applications and has the cylindrical outer surface 183 interrupted by a peripheral groove 184. On its inner side the ring has a centrally disposed internal rib 185. On opposite sides of this are conoidal or slightly tapered surfaces 186.

The ring is mounted in a peripheral recess in the piston which is shaped to provide surfaces 188 which taper correspondingly to the ring surfaces 186 and a central deep portion 189 freely accommodating the rib 185. Each of surfaces 188 is grooved at 193 to accommodate a resilient seal ring, such as the O ring 194. The piston may be made in two parts 195 and 196 detachably secured together in any manner, as by nut 197 on rod 198, for example, to facilitate fitting of the ring 182.

If desired the metal ring 182 may be made so thin in the region of the resilient seal rings 194 that it will actually be slightly expanded against the cylinder wall when substantial fluid pressure bears against the resilient rings. Also, by selective location of the resilient rings 194 with relation to the ends of the metal ring 182 the characteristics of the ring can be varied. Thus, by placing the resilient rings 194 almost at the ends of ring 182, a scraping action is obtained as the metal ring is expanded at its ends. By placing the resilient rings in farther from the ends of the metal ring the latter is expanded in a region inwardly of its ends without expanding the ends into scraping engagement with the cylinder wall.

I claim:

1. In means for effecting a seal between an outer member having a cylindrical inner surface and an inner member therein having an outer cylindrical surface, a metal seal ring having a cylindrical outer surface, having a central internal rib and having a conoidal inner surface on each side of said rib substantially intersecting said outer surface whereby to provide a thin edge at each end of said ring, said inner member having a peripheral recess providing conoidal surfaces corresponding to the conoidal surfaces of said metal seal ring and having a central deep portion freely receiving said rib, said inner member having an auxiliary groove in each of its conoidal surfaces, and a resilient seal ring in each of said auxiliary grooves.

2. Means as set forth in claim 1 in which said metal seal ring has a centrally disposed peripheral groove.

3. In means for effecting a seal between an outer member having a cylindrical inner surface and an inner member therein, a metal seal ring between said inner and outer members having a cylindrical outer surface, said ring having a relatively thick section and having a relatively thin section extending axially therefrom and tapering to a relatively thin end portion, and a resilient seal ring carried by said inner member between said seal ring and said inner member, said resilient seal ring being positioned axially inward of said thin end portion of said metal seal ring whereby to permit of radial expansion of said metal seal ring at the thin end portion thereof under high fluid pressure, and interengaging means on said inner member and said metal seal ring for preventing axial displacement of said metal seal ring relative to said inner member.

4. In means for effecting a seal between an outer member having a cylindrical inner surface and an inner member therein, a metal seal ring having a cylindrical outer surface for sliding engagement with the inner surface of said outer member, said ring having a relatively thick intermediate section and tapering therefrom to the ends to provide thin end portions, said inner member having a groove substantially receiving said metal seal ring, and a pair of resilient seal rings carried by said inner ring beneath said metal seal ring, said resilient seal rings being disposed, respectively, intermediate the ends of said seal ring and the central portion thereof.

References Cited in the file of this patent
UNITED STATES PATENTS

| | | |
|---|---|---|
| 174,317 | St. John | Feb. 29, 1876 |
| 268,684 | Jones | Dec. 5, 1882 |
| 511,423 | Hinckley | Dec. 26, 1893 |
| 680,465 | Reynolds | Aug. 13, 1901 |
| 2,226,273 | Westefeldt | Dec. 24, 1940 |
| 2,480,633 | Christensen | Aug. 30, 1949 |
| 2,487,512 | Berger | Nov. 8, 1949 |